United States Patent
Lu et al.

(10) Patent No.: US 8,116,746 B2
(45) Date of Patent: Feb. 14, 2012

(54) TECHNOLOGIES FOR FINDING RINGTONES THAT MATCH A USER'S HUMMED RENDITION

(75) Inventors: Lie Lu, Beijing (CN); Yutao Xie, Beijing (CN); Xing Xie, Beijing (CN); Jiafan Ou, Beijing (CN); Ruihao Weng, Guangzhou (CN)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 11/712,707

(22) Filed: Mar. 1, 2007

(65) Prior Publication Data

US 2008/0215319 A1 Sep. 4, 2008

(51) Int. Cl.
H04M 3/42 (2006.01)

(52) U.S. Cl. ............... 455/414.1; 455/403; 455/417; 455/419; 455/557; 704/231

(58) Field of Classification Search .......... 455/419, 455/557, 417; 704/231
See application file for complete search history.

(56) References Cited

U.S. PATENT DOCUMENTS

| | | | |
|---|---|---|---|
| 5,874,686 A | 2/1999 | Ghias et al. | |
| 6,941,275 B1 * | 9/2005 | Swierczek | 705/26 |
| 7,027,987 B1 | 4/2006 | Franz et al. | |
| 7,103,550 B2 | 9/2006 | Gallagher et al. | |
| 2002/0038597 A1 * | 4/2002 | Huopaniemi et al. | 84/609 |
| 2003/0023421 A1 * | 1/2003 | Finn et al. | 704/1 |
| 2003/0171926 A1 | 9/2003 | Suresh et al. | |
| 2003/0182113 A1 | 9/2003 | Huang | |
| 2005/0086052 A1 * | 4/2005 | Shih | 704/207 |
| 2005/0111633 A1 | 5/2005 | Osborne | |
| 2005/0215239 A1 * | 9/2005 | Kopra et al. | 455/414.1 |
| 2006/0021494 A1 * | 2/2006 | Teo et al. | 84/616 |
| 2006/0173682 A1 | 8/2006 | Manabe | |
| 2006/0235696 A1 | 10/2006 | Bennett | |
| 2006/0246407 A1 * | 11/2006 | Kang et al. | 434/307 A |

(Continued)

FOREIGN PATENT DOCUMENTS

JP 2004-145236 A 5/2004

(Continued)

OTHER PUBLICATIONS

Franz, et al., "Searching the Web by Voice", http://delivery.acm.org/10.1145/1080000/1071887/p3-franz.pdf?key1=1071887&key2=1182287611&coll=ACM&dl=ACM&CFID=75919783&CFTOKEN=92791909.

Fujii, et al., "Speech-Driven Text Retrieval: Using Target IR Collections for Statistical Language Model Adaptation in Speech Recognition", http://if-lab.slis.tsukuba.ac.jp/fujii/paper/sigir2001ws.ps.

(Continued)

Primary Examiner — Nick Corsaro
Assistant Examiner — Chuong A Ngo
(74) Attorney, Agent, or Firm — L. Alan Collins; Collins & Collins Incorporated

(57) ABSTRACT

Described is a technology by which a user hums, sings or otherwise plays a user-provided rendition of a ringtone (or ringback tone) through a mobile telephone to a ringtone search service (e.g., a WAP, interactive voice response or SMS-based search platform). The service matches features of the user's rendition against features of actual ringtones to determine one or more matching candidate ringtones for downloading. Features may include pitch contours (up or down), pitch intervals and durations of notes. Matching candidates may be ranked based on the determined similarity, possibly in conjunction with weighting criterion such as the popularity of the ringtone and/or the importance of the matched part. The candidate set may be augmented with other ringtones independent of the matching, such as the most popular ones downloaded by other users, ringtones from similar artists, and so forth.

14 Claims, 5 Drawing Sheets

U.S. PATENT DOCUMENTS

| | | | |
|---|---|---|---|
| 2006/0293897 A1 | 12/2006 | White et al. | |
| 2007/0131094 A1* | 6/2007 | Kemp | 84/609 |
| 2007/0156645 A1* | 7/2007 | Mohajer et al. | 707/2 |
| 2007/0162497 A1* | 7/2007 | Pauws | 707/104.1 |
| 2007/0163425 A1* | 7/2007 | Tsui et al. | 84/609 |

FOREIGN PATENT DOCUMENTS

| | | |
|---|---|---|
| KR | 10-2001-0094312 A | 10/2001 |
| KR | 10-2004-0052771 A | 6/2004 |
| KR | 10-2006-0019096 A | 3/2006 |
| KR | 10-2006-0132607 A | 12/2006 |

OTHER PUBLICATIONS

Prechelt, et al., "An Interface for Melody Input", Date: Jun. 2001, pp. 133-149, vol. 8, No. 2, http://delivery.acm.org/10.1145/380000/376978/p133-prechelt.pdf?key1=376978&key2=4583287611&coll=GUIDE&dl=GUIDE&CFID=75919783&CFTOKEN=92791909.

International Search Report and Written Opinion Received for PCT Application No. PCT/US2008/055579, mailed on Aug. 14, 2008, 11 pages.

* cited by examiner

TECHNOLOGIES FOR FINDING RINGTONES THAT MATCH A USER'S HUMMED RENDITION

BACKGROUND

Downloading ringtones to mobile telephones has quickly become a billion-dollar industry. Many mobile telephone users search and download their favorite ringtones or ringback tones (music heard by the waiting caller prior to the callee answering) to their mobile phones.

To find a desired ringtone (or ringback tone), users generally enter some text information, such as the artist or title, to search for the desired ringtone through a web service or WAP (Wireless Application Protocol) service. However, it is usually inconvenient to input text on small devices. Further, many users often do not know or cannot recall the exact titles and/or artists of songs for which they seek ringtones, although each user will typically remember its general melody and beat. Such users and the ringtone industry would benefit by an alternative model for finding desired ringtones.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which user input comprising a user-provided rendition of a ringtone is received, and matched to actual ringtones to determine at least one matching candidate ringtone. The rendition may be vocal (e.g., sung or hummed) or from some other musical source, (e.g., played on an instrument and/or a recording). The matching candidate ringtone or ringtones may be identified or otherwise provided in a selection set that is returned in response to the user input.

In one example implementation, similarity of user input to actual ringtones is determined by processing the user-provided rendition of the ringtone into features, such as segmenting audio data (in a memory or in a file) containing the data into notes, and determining characteristics of those notes, such as pitch contours (up or down relative to another note), pitch intervals and durations. The user input data is aligned with a candidate ringtone via the pitch contours of each, and similarity is determined via the similarity of the pitch intervals and durations between the user input and the candidate ringtone. The selection set may be ranked based on the determined similarity, alone or in conjunction with weighting criterion such as the popularity of the ringtone and/or the importance of the matched part with respect to the ringtone.

In one example environment, a query-by-hum service receives the audio from the mobile client that corresponds to the user-provided rendition of a user-desired ringtone. The search platform may be a wireless application protocol (WAP)-based search platform, an interactive voice response-based search platform, and/or a simple message service (SMS)-based search platform. The service provides corresponding audio data (e.g., in memory or in a file) to a processing component (e.g., of a server), which processes the data into the feature data that the matching component matches against feature data of actual candidate ringtones.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
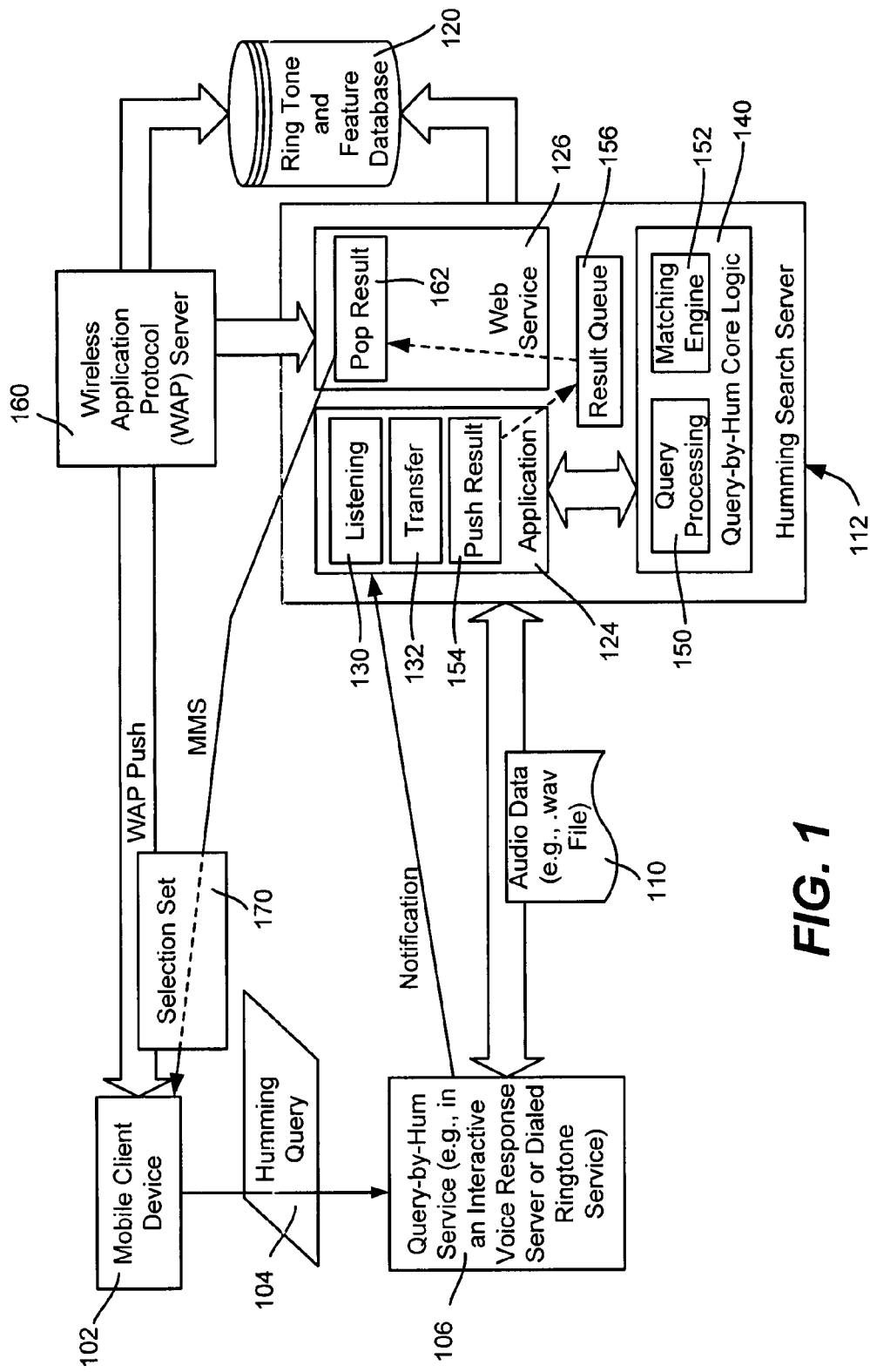
FIG. 1 is a block diagram representing an example architecture for finding and downloading a ringtone based on sounds received from a mobile client at a service.

Various aspects of the technology described herein are generally directed towards matching a ringtone to audio input by a mobile client. In general, the client will sing or hum part of a song for which a ringtone is being sought, and that audio data used to search and locate a corresponding ringtone. Alternatives to voice input are feasible, e.g., a client can play an instrument or have the mobile phone detect recorded playback. Any download model is feasible, e.g., the mobile client can then automatically receive the ringtone, can preview the matched ringtone to ascertain that the correct one was located, or can select from several matched ringtones, such as ranked by likelihood of intent.

As used herein, the term "ringtone" is meant to include any pre-recorded audio that can be downloaded to a mobile device for notification purposes, independent of the actual use of that audio. For example, ringback is audio heard by a caller before the called mobile phone is answered or otherwise handled (e.g., blocked, ignored or switched to voicemail), and is thus equivalent to a ringtone. Other audible notifications, such as receipt of a text message, instant message, email message, a calendar/timer reminder, a warning, and so forth that can be configured to play a downloaded audio file or part of a file are also considered equivalent to a ringtone for purposes of this description.

Further, the various aspects are independent of any particular business or revenue model with respect to downloading the ringtones. For example any one or combination of models, including subscription-based models (in which users can access the query-by-humming service by paying subscription fees), pay-per-download models (in which users pay when downloading a ringtone), pay-per-call models (in which users pay each time they call into the query-by-humming service) and/or advertisement models (in which users can access the query-by-humming service without charge or with a reduced charge but receive certain amounts of advertisements) provide feasible alternatives.

In one example implementation, various servers and the like are provided to facilitate the matching of a ringtone or set of candidate ringtones to a user's input audio. For example, there is a described an example server with various software including speech recognition software by which the user, via a client telephone device, uses speech to request a service to perform operations on behalf of the client, including search for a ringtone. However, as will be understood, the technology described herein is not limited to such a server, but applies to any service, telephone system or systems that can communicate over virtually any communications medium and execute logic. For example, a single computer system or one on a home or small business network may implement the structure and functionality described herein, e.g., to provide a telephone with the benefits of ringtone matching and other technologies, as well as searching for audio content based on user audio input.

Further, various protocols, interfaces, formats (e.g., .wav and MIDI) and so forth are used as examples herein, but the technology described herein is not limited to any of these examples. Moreover, any suitable ringtone search platform may be used, e.g., WAP-based, IVR-based (interactive voice response) or SMS-based (simple message service) ringtone search platforms.

As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and mobile telephony in general.

Turning to FIG. 1, there is shown a mobile client 102 that provides a "humming" query 104 to a query-by-hum service provider, such as an interactive voice response server or a dialed-up service 106. As described above, the "humming" may be any musical-type input corresponding to a rendition of a ringtone that the user considers as being available for downloading, including singing and/or humming (possibly some of the lyrics and/or making "mm-mm-mm," "la-la-la" or "da-da-da" sounds and the like), whistling, playing an instrument including any tone-generator or percussion generator, and/or may be live or played back from a recording. Note that the input may be substantially hands-free input to a large extent, at least with respect to what is detected by the mobile client device 102.

As represented in FIG. 1, the service 106 recognizes this query 104 as a request for a ringtone search. The recognition may result from the musical nature of the user input, but in a more practical model, is detected in response to user actions following prompts from the service 106, such as a prompt for the user to begin providing the audio corresponding to the desired ringtone, that is, the humming query 104.

Alternatives to using the service 106 include the user using the mobile client device 102 to log into a webpage (e.g., through WAP), and/or other ways to connect to a service, such as pressing a dedicated button that connects the user to the device's service provider. Still further, an analog or digital (e.g., VoIP) telephone or a microphone connected to a computing device may couple to such a service, to download the ringtone to the mobile client device 102, directly or via any intermediate storage mechanism. For example, a user can hum a tune into a microphone of a personal computer while that user is connected to a website or web service, receive one or more matching ringtone selection options, select a ringtone as necessary and download the song to the personal computer for later transferring to the mobile device. In any event, the user provides the musical input corresponding to a rendition of a ringtone that the user considers as being likely available for downloading.

Regardless of where received, the humming query is temporarily maintained in audio data 110 (e.g., recorded into a memory block or an audio file, such as a .wav file), which may then be sent to a ringtone humming search server 112 for further processing. In FIG. 1 the transferring of the audio data 110 is exemplified as being performed by the service 106. Note that the service 106 and search server 112 may be combined into a unified component.

In general, and as described below, the recorded audio file comprising a humming fragment is processed and matched against a database 120 associated with the ringtone humming search server 112. Then, a list of one or more matched results is returned as a selection set of identified ringtones to the user, e.g., through WAP or via MMS (multimedia messaging service). Each returned ringtone identifier (e.g., title) in the selection set may be attached with more information such as artist and lyrics, to help the user to identify a desired ringtone from among those returned. It is also feasible to have the user hear at least part of the ringtones to help in making a selection. Additional information such as recommended other ringtones, e.g., related songs or the current top ten ringtones, may be returned to the user as well, such as in the same list or a separate list. The user may then select one or more ringtones from the list or lists to download.

Alternatively, in a model in which only one ringtone is matched (e.g., the best match), the selection set may include the ringtone audio file itself. The user can then identify the ringtone to the mobile device 102, e.g., name the audio file and its intended use as the ringtone, or discard.

To process the audio humming fragment, as represented in FIG. 1, the humming search server 112 includes (or is otherwise associated with) an application 124 and a web service 126. In one example implementation, the application 124 listens via a listening component 130 for a notification, e.g., a datagram on a specified port. When the notification datagram arrives, the application 124 launches a transfer thread 132 to transfer the audio data 110 to local storage (e.g., memory), for processing by query-by-hum core logic 140.

More particularly, the humming search server, via a pre-process component 150 of the core logic 140, processes the audio into various feature data corresponding to the audio data 110. These features are then matched by a match component 152 against features for actual ringtones maintained in the database 120. In general, the database 120 stores the ringtone information for the search results, as well as the features of the ringtones that are used to match against features of the audio data 110 that corresponds to the humming query 104. One or more match results are returned to the application 124, which pushes the result 154 to a results queue 156.

In one example implementation, the web service 126 provides the results as a selection set 170 back to the client device 102, such as by an MMS message or the like. Alternatively, a WAP server 160 may obtain (e.g., pop) the result 162 from the results queue 156, e.g., at regular or other appropriate intervals to get a selection set of matching results, and then push the selection set 170 back to the client device. The WAP server 160 may instead wait for the client to connect to a WAP web page to see the results.

Figure 2:
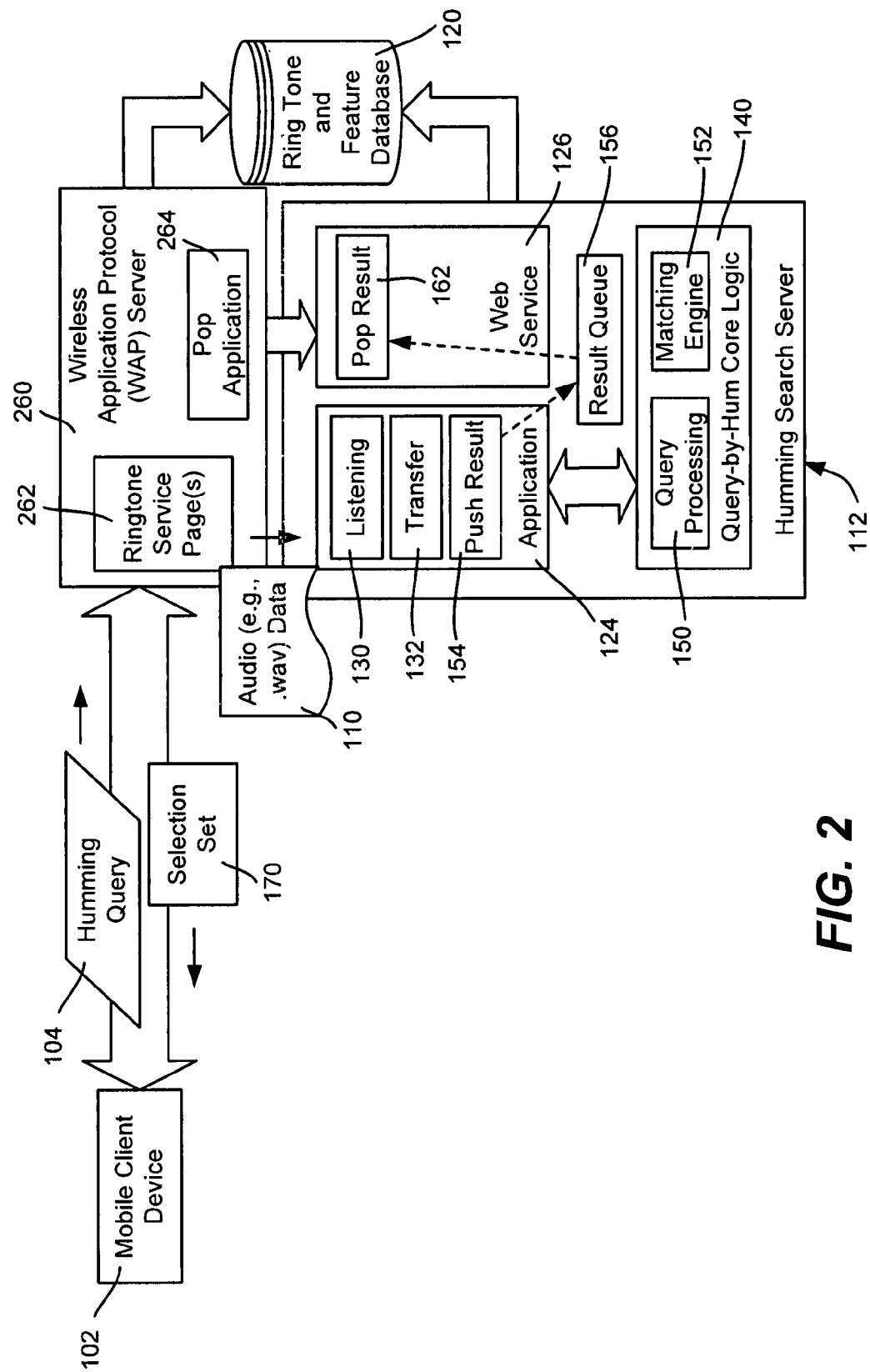
FIG. 2 is a block diagram representing an example architecture for finding and downloading a ringtone based on sounds received from a mobile client via a server web page or pages.

In an alternative example implementation generally represented in FIG. 2, a WAP server 260 provides a ringtone search service via web pages 262. Another application 264 running on the WAP server 260 calls the web service 126 of the humming search server 112 at regular or other appropriate intervals to get matching results, for sending to the mobile client as the selection set 170.

Figure 3:
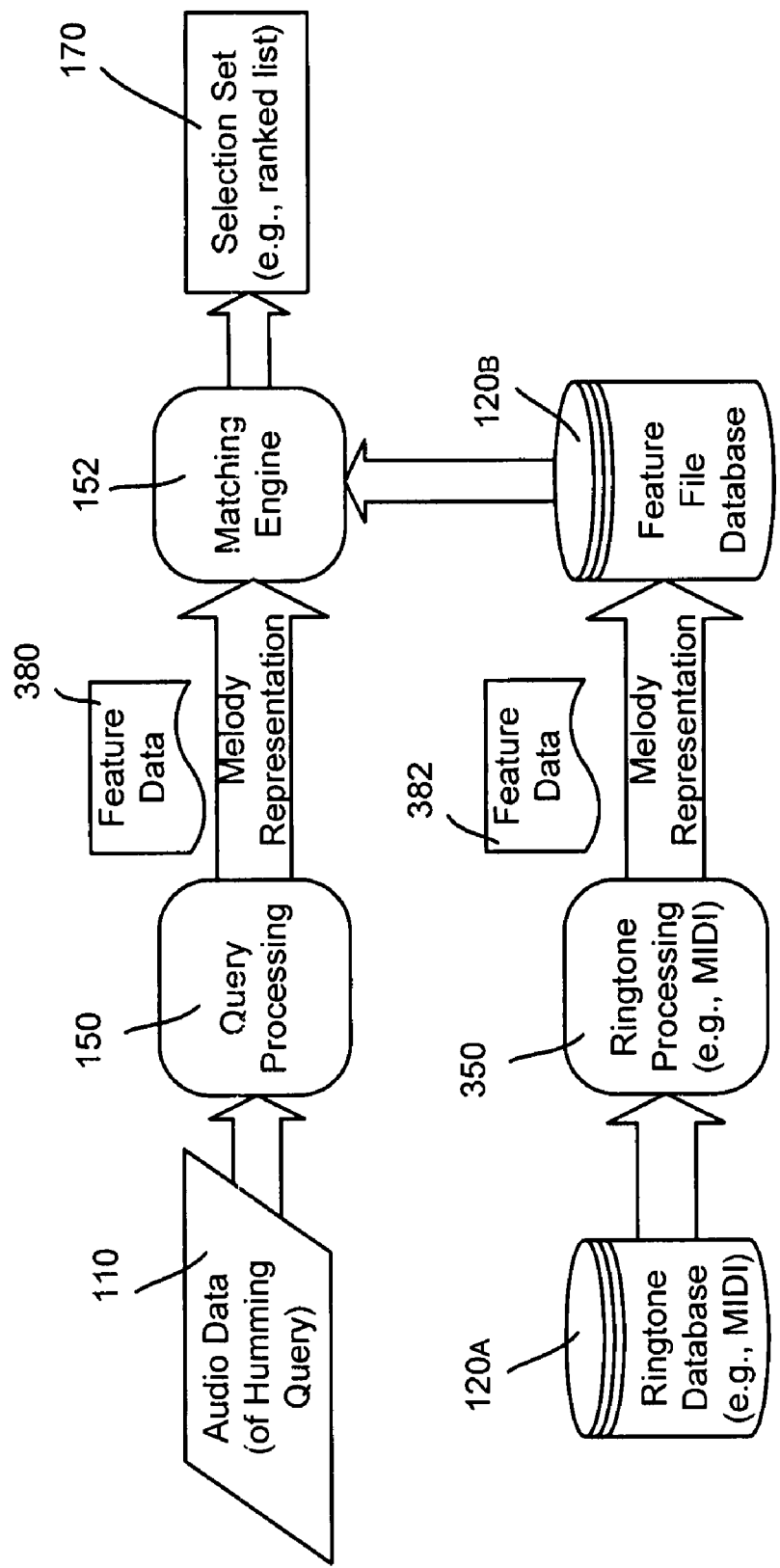
FIG. 3 is a flow diagram representing example steps taken when processing user input to match it to a ringtone or the like based on client-provided audio data.

FIG. 3 provides additional information on an example mechanism for performing the query processing and matching operations, represented in FIGS. 1 and 2 by the query-by-hum core logic 140, e.g., implemented as a DLL. In general, query processing 150 deals with the humming audio data 110, and performs pitch tracking, and note segmentation that includes energy contour segmentation and pitch variation segmentation. Essentially, the processing converts the audio file to feature data corresponding to a melody representation.

More particularly, as part of processing, in one example implementation a triplet melody representation comprising pitch contour, pitch interval and duration is developed, such as for each detected (segmented) note. (Note that "triplet" as used above does not refer to a triplet in the musical sense of three notes played in the time of two corresponding notes.) Pitch contour is represented by up or down data, that is, whether pitch is increasing or decreasing relative to a previous note. Pitch interval refers to the amplitude of note variation, e.g., frequency in units of hertz (Hz) or semitones. Duration represents how long a note is played or hummed. The feature data 252 is then representative of the user rendition of the desired ringtone.

Similarly, actual ringtones have been (typically previously) processed into their feature data 382, such as whenever a new ringtone became available for storing in the ringtone portion 120A of the database 120. Note that ringtones for different mobile devices have different formats, an example of which is the MIDI format. Ringtone processing 350 (e.g., MIDI processing) picks out the main melody track, and converts the melody track into feature data 382 corresponding to a melody representation, using generally the same features. These features are stored in the feature file portion 120B of the database 120. When the feature data of humming audio data 110 is available, the matching engine 152 performs one or more matching steps to determine which actual ringtone features match the user input feature data. For example, approximate string matching, dynamic programming, or viterbi alignment may be used to align the melody contour or note segments between query and candidate ringtones. According to the matched path, the similarity of pitch interval and rhythm between the query and candidate ringtones may be computed. HMM (Hidden Markov Model)-style lattice matching, and matching without note segmentation may also be applicable in other embodiments.

The result is a selection set 170 containing one or more candidate ringtones. The list 170 may be ranked, primarily by a score corresponding to the melody similarity as deemed during the matching operation. However, other information may also be considered, such as by weighting by popularity and/or the importance of the matched part, e.g., whether the matched part is the main tune or chorus. Further, the list may be augmented by adding other recommended ringtones, such as the ten most popular ringtones downloaded by others within some time frame, by what other ringtones have been downloaded by the user; by artist or genre, by recommending based on the user's interest profile (discovered from a search history), and so forth.

Figure 4:
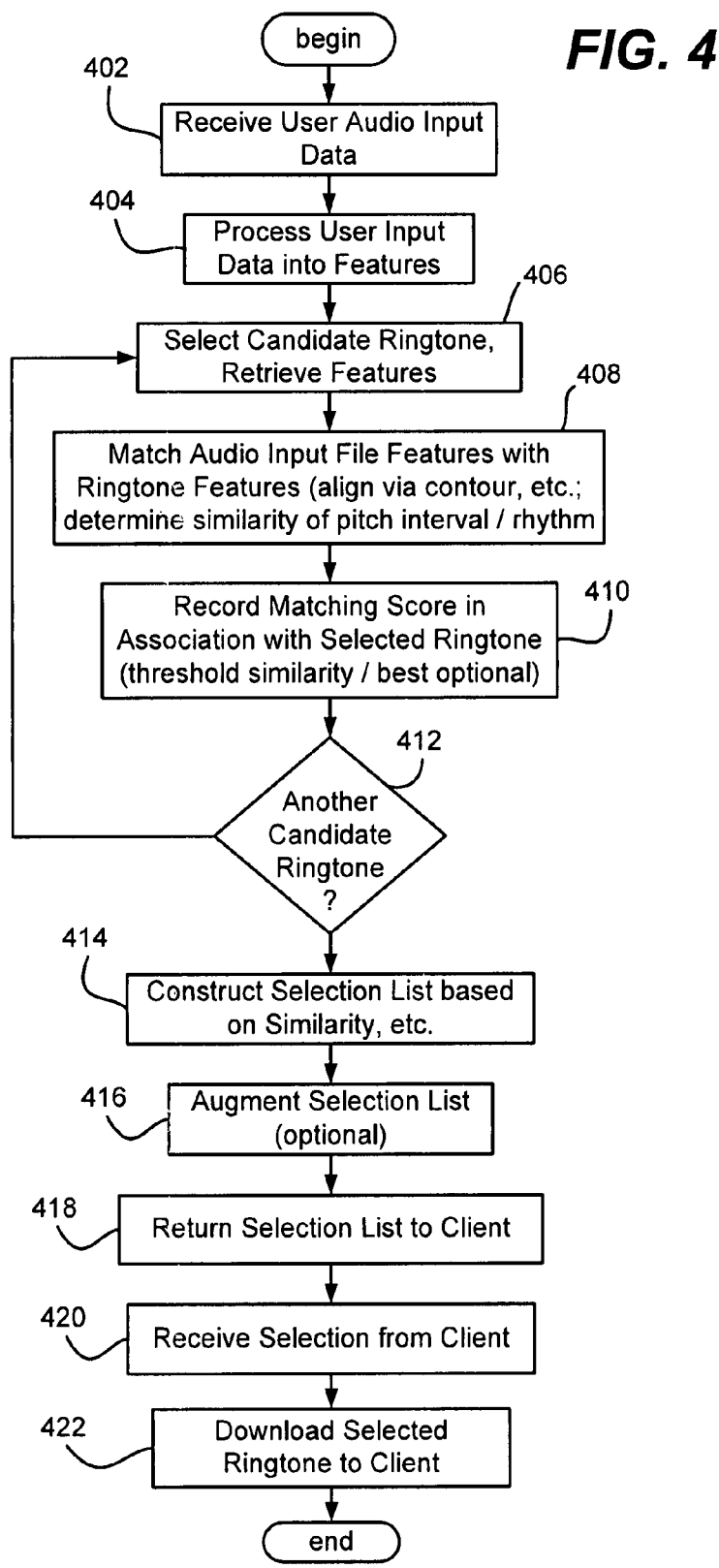
FIG. 4 is a flow diagram further exemplifying the processing user input to match it to candidate ringtones based on features of the user data.

FIG. 4 summarizes the query processing and matching operations, beginning at step 402 where the user input (humming query) is received. The user input is processed into features as described above, e.g., segmented into notes, which are then each given a set of values representing up or down (e.g., U/D) pitch contour, pitch interval and duration. Note that the user input data may be processed directly or may have first been saved as an audio file which is then processed.

Step 406 selects a candidate ringtone, which may be one of all of the available ringtones, or one of a subset found by some pre-matching operation. Step 408 represents matching, including aligning the features such as based on the contour or viterbi alignment on the notes, and determining the similarity based on pitch interval, rhythm/note duration, and so forth. Step 410 represents recording a score for the similarity. Note that a threshold similarity may be required, or alternatively, only the best candidate scores (e.g., the top twenty) may be kept such as by having the threshold set to the lowest score of the top twenty once twenty have been scored.

Step 412 represents looping back to repeat the process with a different candidate ringtone until each of the candidates have been evaluated. Note that the exemplary loop may be exited early in the event one or more scores are found that achieve or are substantially close to a perfect similarity.

Step 414 represents constructing the selection list, which is primarily based on similarity scores. However, as mentioned above, weighting and so forth may be applied so that more popular ringtones, which are more likely to be desired by more users, can move up the list. Note that the recorded scores may contain more candidates than actually returned to the user so that weighting or the like can move a ringtone up the list, e.g., twenty may be recorded with scores and then adjusted by weight, with the top ten returned to the user following the weighting process. Step 416 augments the selection list, such as by adding recommended ringtones based on other criteria (e.g., the ten most popular downloaded by others) as described above.

Step 418 represents returning the list to the client, who then may make a selection (step 420) from the list. If one is selected, the ringtone is downloaded, as represented by step 422. In the event no ringtone is selected, any data maintained on behalf of the client may be discarded or otherwise used, such as for history purposes.

Exemplary Operating Environment

Figure 5:
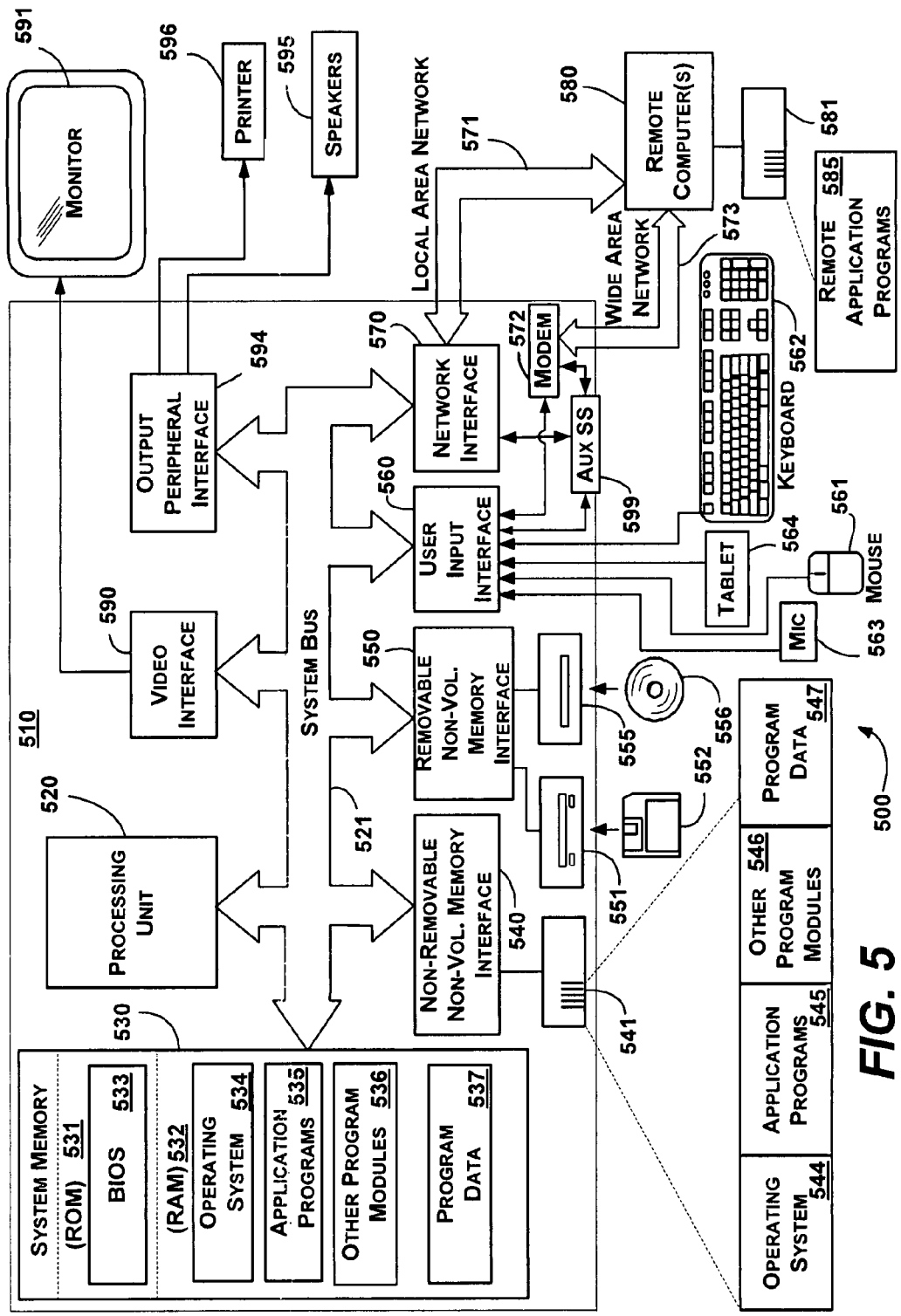
FIG. 5 shows an illustrative example of a general-purpose network computing environment into which various aspects of the present invention may be incorporated.

FIG. 5 illustrates an example of a suitable computing system environment 500 on which the hum processing server 112 of FIG. 1 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   receiving audio data via a mobile phone, wherein the audio data originates live from a user of the mobile phone at the time of the receiving, and wherein the audio data comprises a humming or singing rendition provided live by the user, and wherein the humming or singing rendition represents at least a portion of a desired ringtone;
   processing the received humming or singing rendition of the audio data resulting in a triplet melody representation comprising data that comprises pitch contour, pitch interval, and duration for each detected note of the humming or singing rendition, wherein the pitch contour indicates whether pitch of the each detected note is increasing or decreasing relative to a previous note, and wherein the pitch interval indicates a frequency of the each detected note, and wherein duration indicates a length in time of the each detected note;
   matching, based on at least the triplet melody representation of the humming or singing rendition, the humming or singing rendition of the desired ringtone to a ringtone triplet melody representation derived from of a corresponding one of the plurality of actual ringtones, wherein the plurality of actual ringtones and corresponding ringtone triplet melody representations derived from each of the plurality of actual ringtones are stored in a database, and wherein each stored ringtone triplet melody representation comprises the pitch contour, the pitch interval, and the duration for each detected note of its corresponding one of the plurality of actual ringtones;
   providing the matched corresponding one of the plurality of actual ringtones to the mobile phone; and
   wherein the method is performed by a computing device.

2. The method of claim 1 further comprising, converting the audio data to an audio file.

3. The method of claim 1 further comprising:
   receiving selection data from the user via the mobile phone that selects one of the matched at least one of the plurality of actual ringtones; and
   downloading, in response to the receiving the selection data, the one of the matched at least one of the plurality of actual ringtones to the mobile phone.

4. The method of claim 1 further comprising ranking the matched at least one of the plurality of actual ringtones.

5. The method of claim 4 wherein the ranking is based on at least one weighting criterion.

6. The method of claim 1 wherein the providing further comprises providing at least one recommended ringtone with the matched at least one of the plurality of actual ringtones, wherein the at least one other recommended ringtone is provided based on an interest profile of the user.

7. The method of claim 1 wherein the receiving comprises detecting a user coupling to a voice response server.

8. A system comprising:
   a service of a computer configured to receive audio data via a mobile phone, wherein the audio originates live from a user of the mobile phone, and wherein the audio data comprises a humming or singing rendition provided live by the user, and wherein the humming or singing rendition represents at least a portion of a desired ringtone;
   a processing component of the computer coupled to the service and configured to process the received humming or singing rendition of the audio data into a triplet melody representation comprising data that comprises pitch contour, pitch interval, and duration for each detected note of the humming or singing rendition, wherein the pitch contour indicates whether pitch of the each detected note is increasing or decreasing relative to a previous note, and wherein the pitch interval indicates a frequency of the each detected note, and wherein duration indicates a length in time of the each detected note;
   a matching component of the computer coupled to the processing component and configured to match, based on at least the triplet melody representation of the humming or singing rendition, the humming or singing rendition of the desired ringtone to a ringtone triplet melody representation derived from a corresponding one of the plurality of actual ringtones, wherein the plurality of actual ringtones and corresponding ringtone triplet melody representations derived from each of the plurality of actual ringtones are stored in a database, and wherein each stored ringtone triplet melody representation comprises the pitch contour, the pitch interval, and the duration for each detected note of its corresponding one of the plurality of actual ringtones; and
   the service further configured to provide the matched corresponding one of the plurality of actual ringtones to the mobile phone.

9. The system of claim 8 further comprising a wireless application protocol (WAP)-based search platform, an interactive voice response-based search platform, or a simple message service (SMS)-based search platform.

10. The system of claim 8 wherein the service is further configured to convert the received audio data to a file.

11. The system of claim 8 wherein the service is part of a subscription-based model, a pay-per-download model, a pay-per-call model or an advertisement model, or any combination thereof.

12. At least one computer storage media that is an article of manufacture storing computer-executable instructions that, when executed by a computer, cause the computer to perform a method comprising:

receiving audio data via a mobile phone, wherein the audio originates live from a user of the mobile phone, and wherein the audio data comprises a humming or singing rendition provided live by the user, and wherein the humming or singing rendition represents at least a portion of a desired ringtone;

processing the received humming or singing rendition of the audio data into a triplet melody representation comprising data that comprises pitch contour, pitch interval, and duration for each detected note of the humming or singing rendition, wherein the pitch contour indicates whether pitch of the each detected note is increasing or decreasing relative to a previous note, and wherein the pitch interval indicates a frequency of the each detected note, and wherein duration indicates a length in time of the each detected note;

matching, based on at least the triplet melody representation of the humming or singing rendition, the humming or singing rendition of the desired ringtone to a ringtone triplet melody representation derived from a corresponding one of the plurality of actual ringtones, wherein the plurality of actual ringtones and corresponding ringtone triplet melody representations derived from each of the plurality of actual ringtones are stored in a database, and wherein each stored ringtone triplet melody representation comprises the pitch contour, the pitch interval, and the duration for each detected note of its corresponding one of the plurality of actual ringtones; and providing the matched corresponding one of the plurality of actual ringtones to the mobile phone.

13. The at least one computer storage media of claim 12 wherein the providing further comprises ranking the matched at least one of the plurality of actual ringtones based on at least one criterion, the at least one criterion including public popularity of the matched at least one of the plurality of actual ringtones.

14. The at least one computer storage media of claim 12 wherein the providing further comprises ranking the matched at least one of the plurality of actual ringtones based on at least one criterion, the at least one criterion including whether the matched at least one of the plurality of actual ringtones is part of a main tune or is part of a chorus.

* * * * *